United States Patent [19] [11] 4,358,128
Chambers [45] Nov. 9, 1982

[54] SELF ALIGNING TRUCK TRAILER

[76] Inventor: Arthur D. Chambers, P.O. Box 702, Lumby, British Columbia, Canada, V0E 2G0

[21] Appl. No.: 182,839

[22] Filed: Aug. 29, 1980

[51] Int. Cl.³ .............................................. B60P 3/40
[52] U.S. Cl. ................................ 280/404; 280/423 A; 280/480
[58] Field of Search ................... 280/404, 480, 423 R, 280/423 A, 408

[56] References Cited

U.S. PATENT DOCUMENTS

| 1,845,859 | 2/1932 | Williamson | 280/480 |
| 2,090,874 | 8/1937 | Myers | 280/404 |
| 3,232,636 | 2/1966 | Buchanan | 280/404 |
| 4,017,094 | 4/1977 | Pilcher | 280/404 |
| 4,162,082 | 7/1979 | Curry | 280/408 |
| 4,200,305 | 4/1980 | Eubanks | 280/404 |

FOREIGN PATENT DOCUMENTS

368132 1/1923 Fed. Rep. of Germany ...... 280/404

Primary Examiner—Joseph F. Peters, Jr.
Assistant Examiner—Donn McGiehan
Attorney, Agent, or Firm—Lane, Aitken, Kice & Kananen

[57] ABSTRACT

Trailer and trailer connector for tractor/trailer for carrying elongated, self-supporting load. Tractor has conventional swivellable front bunk for supporting front of load, and trailer has a wheeled rear bogey and a non-swivelling rear bunk for rear of load. The trailer connector has a flexible link and a forward connection which connects forward end of link to front bunk and a rear connection which connects rear end of the link to the trailer. Length of the link does not change while towing the trailer and thus maintains tractor/trailer wheel alignment prior to loading. Trailer connector is considerably lighter than conventional telescopic trailer reaches, thus increasing maximum payload of tractor/trailer, and is less costly and easier to maintain than trailer reach, and also provides a more stable load platform.

6 Claims, 15 Drawing Figures

SELF ALIGNING TRUCK TRAILER

BACKGROUND OF THE INVENTION

1. Field of the Invention

The invention relates to a trailer connector and trailer for use in a truck and trailer combination for carrying elongated self-supporting loads, in particular to logging trucks and the like.

2. Prior Art

Truck and trailer combinations for carrying elongated self-supporting loads have been used for many years, particularly as logging trucks. In the past, logging trucks were used extensively on narrow and winding logging roads and, because the bends in such roads were often relatively tight, it was essential that the rear wheels of the trailer followed closely the tracking arc of the front wheels of the tractor when negotiating the bends. Modern logging trucks use a telescopic trailer reach or compensator that extends rigidly forwardly from the trailer and is hinged to a hitch disposed rearwardly of the truck bunk. The truck bunk and trailer bunk are both swivelling bunks and thus tend to be somewhat unstable when the truck travels at high speeds on the highway. The reach carries negligible tensile loads when the logging truck is loaded and serves mainly to force the rear wheels of the trailer into an arc that approximates to the front wheels of the tractor as the truck negotiates a curve. Nowadays logging roads have been improved considerably, ie. widened and straightened, and commonly semi-trailers or flatbed trailers can use the main logging roads without much difficulty. Consequently, trailer reaches as commonly used for rear wheel tracking purposes are often not required.

Because trailer reaches are relatively heavy components, ie. about three thousand to four thousand pounds, they detract from payload of the truck. It is well known to use a rear trailer to support a rear end of a self-supporting load with no connection between the rear trailer and tractor apart from braking and electrical service conduits. A "non-connected" trailer of this general type is used on modern highways to transport excessively long rigid loads, such as beams for bridges, buildings, etc. When the load is loaded onto the tractor and trailer, considerable care must be exercised to ensure that the wheel axles of the trailer are disposed normally to the central axis of the tractor and trailer combination to ensure accurate tracking of the rear wheels of the combination.

Commonly, when loading this "non-connected" type of tractor/trailer combination, several hours might be required to adjust the relative disposition of the rear trailer by lateral shifting and swivelling to ensure accurate wheel alignment. Whilst such loading time might be acceptable for transporting special loads where transportation costs are not a major consideration, in the logging industry where short turn around times are essential for economical operation, such excessive loading time would be uneconomic. A common logging truck with a telescopic reach can be loaded within minutes with no difficulty in maintaining wheel alignment, and thus, prospective competitive arrangements should be equally quick to load.

SUMMARY OF THE INVENTION

The invention reduces disadvantages of the prior art by providing a trailer connector and tractor for use in a tractor and trailer combination in which there is no rigid connection between the tractor and trailer. The trailer connector is required only for initial trailer wheel alignment prior to loading and because, when the combination is loaded, the load itself transmits towing and turning forces. Thus the trailer connector can be flexible and relatively lightweight as it carries negligible loads when the combination is loaded. The reduction in weight of the trailer connector and thus the combination permits a considerable increase in permissible load carrying capacity of the tractor and trailer combination, and also simplifies maintenance because negligible loads are imposed on the trailer connector for most operations of the truck.

A trailer connector according to the invention is for use in a tractor and trailer combination for carrying an elongated, self-supporting load. The tractor has a swivellable front bunk mounted for pivotting about a pivot axis and is adapted to retain a front portion of the load thereon. The trailer has a rear bogey having at least one pair of road bearing wheels and a non-swivelling rear bunk mounted on the bogey and adapted to retain a rear portion of the load thereon.

The trailer connector is further characterized by flexible link means having right and left hand forward link portions extending rearwardly from the front bunk, right and left hand rear link portions extending forwardly from the trailer, and joining means to join the forward link portions to the rear link portions. The forward and rear link portions form two isosceles triangles with their vertices adjacent the central longitudinal axis coinciding with each other.

The invention further relates to a trailer and trailer connector for use in a tractor and trailer combination for carrying an elongated, self-supporting load. The tractor has a swivellable front bunk mounted for pivotting about a pivot axis and is adapted to retain a front portion of the load thereon. The trailer is characterized by a rear bogey having at least one pair of road bearing wheels and a non-swivelling rear bunk mounted on the bogey and adapted to retain a rear portion of the load thereon. The trailer connector is characterized by right and left hand forward link portions extending rearwardly of the bunk, right and left hand rear link portions extending forwardly from the trailer, and joining means to join the forward link portions to the rear link portions. The forward and rear link portions form two isosceles triangles with their vertices adjacent the central longitudinal axis coinciding with each other.

A detailed disclosure following, related to drawings, describes preferred embodiments of the invention which is capable of expression in structure other than that particularly described and illustrated.

DETAILED DISCLOSURE

Figure 1:
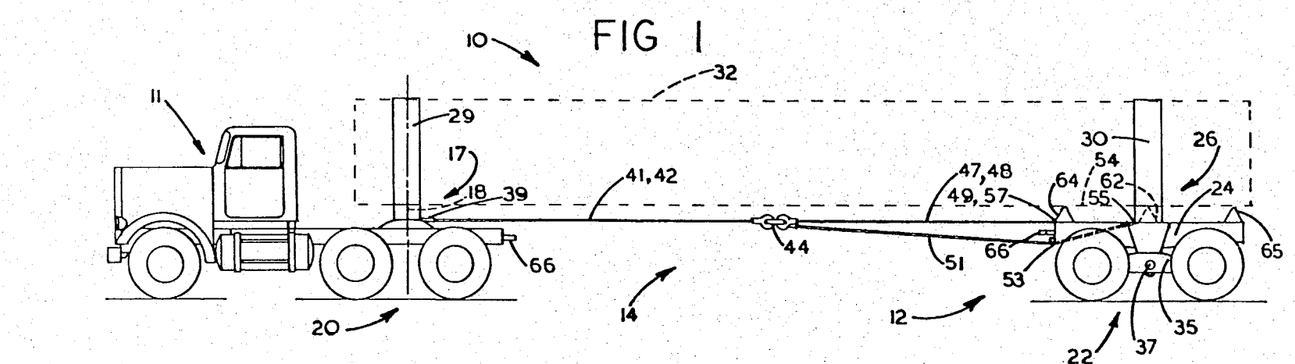
FIG. 1 is a simplified diagrammatic side elevation of a tractor and trailer combination using one embodiment of a trailer connector according to the invention.
Figure 2:
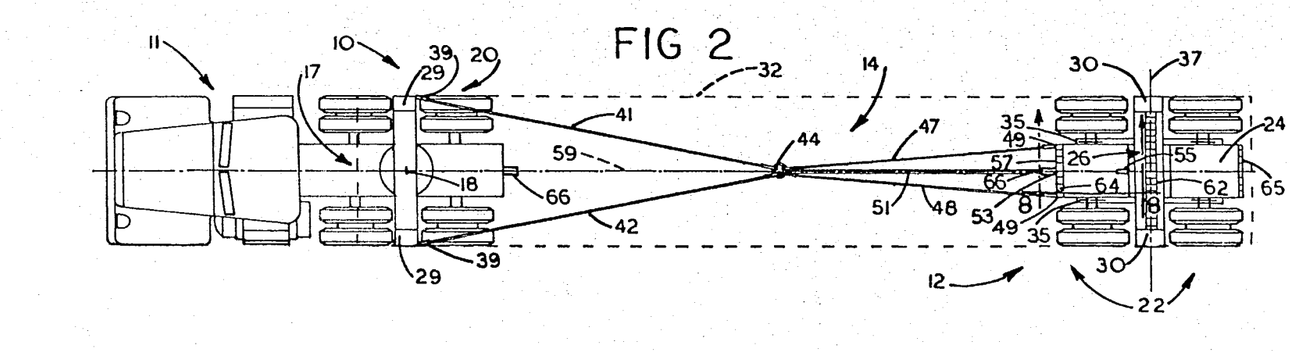
FIG. 2 is a simplified diagrammatic top plan of the embodiment of FIG. 1.
Figures 3, 10:
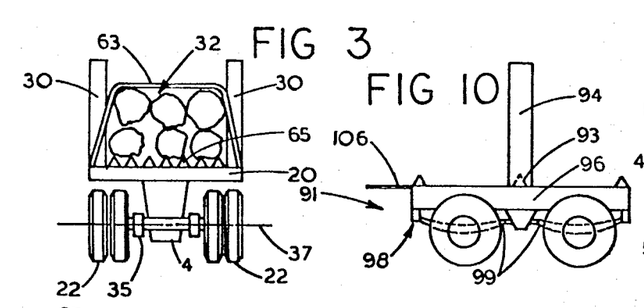
FIG. 3 is a simplified rear elevation of the trailer of FIG. 1.
FIG. 10 is a simplified fragmented side elevation of the alternative trailer and a portion of the trailer connector of FIG. 9.

FIGS. 1 through 3

A tractor and trailer combination 10 according to the invention has an essentially conventional tractor 11 and a modified trailer 12, the trailer being connected to the tractor by a trailer connector 14 according to the invention. The tractor is a typical prior art logging truck tractor having a swivellable front bunk 17 mounted for pivotting about a vertical pivot axis 18 disposed over a set of rear wheels 20 mounted on twin or tandem axles. The trailer 12 has a similar set of tandem wheels 22 mounted on a trailer frame 24 and is termed a rear bogey, the frame carrying a non-swivelling rear bunk 26 mounted on the bogey. The front and rear bunks have pairs of spaced stakes 29 and 30 respectively to support a load of logs 32, broken outline, extending therebetween. The stakes and bunks are generally similar to the prior art except that the rear bunk is mounted rigidly, that is non-swivellably on the rear trailer for reasons to be explained, and thus contrasts with the swivelling rear bunk on common trailers. Loads other than logs can be carried between the bunks, such as concrete or steel beams, etc., provided the load is elongated and self-supporting so as to permit supporting of the load at positions adjacent either end so that the front and rear portions of the load are retained on the front and rear bunks respectively.

The trailer has a walking beam 35 carrying trailer axles for pairs of the wheels 22 spaced longitudinally at opposite ends of the beam on each side of the trailer. The beam is hinged to a lower portion of the frame so as to pivot about a transverse beam axis 37 disposed parallel to the trailer axles as is well known in the prior art. As illustrated, the walking beam thus provides a simple and rugged suspension for the rear trailer and is similar to that commonly used on logging trucks. The walking beam 35 is thus a longitudinal suspension means extending between the wheels, and the frame is hinged to the suspension means for longitudinal rocking movement in a forward and rearwards manner relative to the wheels.

The trailer connector 14 has right hand and left hand forward link portions 41 and 42 extending rearwardly from cable anchors 39 at opposite ends of the front bunk 17 to a loop connector 44 disposed approximately midway between the front and rear bunks, ie. generally adjacent a central portion of the connector 14. The connector 14 also has right hand and left hand rear link portions 47 and 48 extending forwardly from cable anchors 49 at laterally spaced positions on the trailer 12 to connect similarly at the loop connector 44. A stabilizing link 51 extends from a forward end at the loop connector to a rear end secured to a cable anchor 55 on the frame 24. The stabilizing link 51 passes around a pulley 53 mounted on a portion of the trailer spaced beneath a straight line 57 extending between rear connections of the rear link portions with the trailer, as will be described with reference to FIG. 8. Without the stabilizing link when the trailer is unloaded it would otherwise be free to rock longitudinally about the beam axis 37. Therefore, the stabilizing link 51 is required in cooperation with the link portions 47 and 48 to provide three spaced supports to prevent uncontrolled rocking of the trailer frame 24 relative to the wheels 22. It can be seen that the loop connector 44 is, in fact, a joining means to join the forward link portions to the rear link portions and also the stabilizing link to the forward and rear link portions, and in some circumstances can be eliminated, or equivalents can be substituted, as will be described.

The link portions 41, 42, 47 and 48 and the stabilizing link 51 are all suitably flexible steel cable of a diameter of between 0.5 cm. and 2 cm. and thus have sufficient strength to hold the rear trailer when unloaded and yet resist any tendency to form permanent kinks resulting from excessive non-elastic bending of the cable. If a length of cable becomes damaged, for example by a truck running over the cable such that the cable does not straighten under light loads, it should be discarded otherwise it will shorten effective length of the cable. The trailer connector 14 is used primarily to align the axles of the trailer with the rear axles of the tractor prior to loading logs onto the bunks.

The front and rear link portions, the stabilizing link and loop connector 44 are all disposed symmetrically about a central longitudinal axis 59 of the combination 10, and thus it can be seen that the trailer connector 14 is a connector link means extending symmetrically about the central longitudinal axis between at least two laterally spaced positions on the front bunk and at least two laterally spaced positions on the trailer.

The rear bunk 26 has a transversely extending row of teeth or serrations 62 extending between the stakes 30, and front and rear portions of the trailer frame 24 have similar sets of teeth or serrations 64 and 65 respectively disposed so as to be at a similar height to the teeth 62. Tie down cables 63 draw the logs onto the teeth 62, 64 and 65 to augment restraint of rear ends of the logs on the trailer due to dead weight of the log. Clearly, if a load other than logs were to be carried, the teeth or serrations 62, 64 and 65 would be modified to be appropriate for the load. In any event, means to reduce a tendency of the load to shift relative to the rear trailer is provided so as to maintain alignment of the trailer axle or axles relative to line of travel of the combination, that is the trailer axle should at all times be disposed normally to and symmetrically of the longitudinal axis 59.

Pintle and gudgeon means 66 or equivalents thereof are fitted at a rear end of the tractor 11 and at a forward end of the trailer 12 for towing the trailer behind the tractor when unloaded. This is an alternative to the common "piggyback" method of carrying an unloaded logging trailer, although "piggyback" carrying is easy with this invention because trailer service conduits do not require disconnection.

Figure 4:
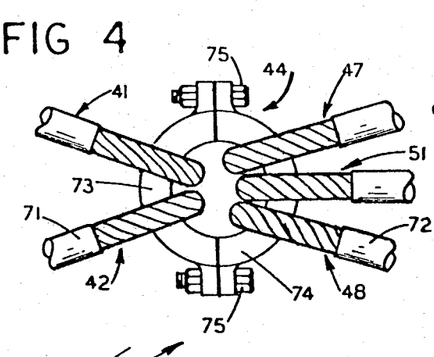
FIG. 4 is a simplified fragmented top plan of a central portion of the trailer connector of FIG. 1.
Figure 5:
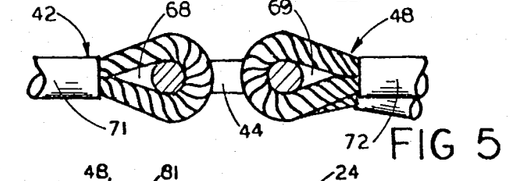
FIG. 5 is a simplified fragmented side elevation of the central portion of the trailer connector shown in FIG. 4.

FIGS. 4 and 5

The loop connector 44 is an annulus adapted to receive eyes fitted to ends of the cables representing the forward link portions 41 and 42, the rear link portions 47 and 48, and the stabilizing link portion 51. Referring to FIG. 5, the left hand forward and rear link portions 42 and 48 have respective eyes 68 and 69 formed at ends of the respective link portions and secured by cylindrical ferrules 71 and 72 respectively. Openings of the eyes can be reinforced with bushings (not shown) if desired, to prevent excessive wear of the cables on the loop connector 44. As seen in FIG. 4, the connector 44 is formed from two semi-circular half portions 73 and 74 connected together by nut and bolt means 75 to permit easy connection and disconnection of the link portions, thus serving as a releasable cable connecting means. Opposite ends of all the link portions are similarly provided with eyes secured by ferrules, as shown in FIG. 5. Other means to permit easy connection and disconnection of link portions can be substituted.

Figure 6:
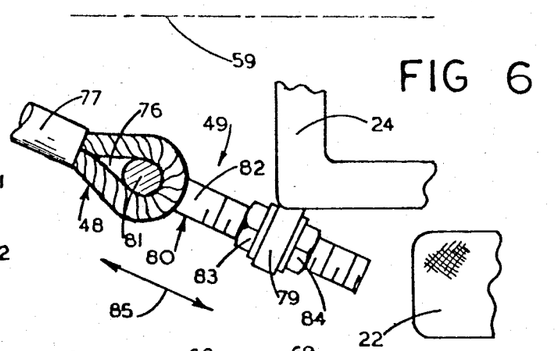
FIG. 6 is a simplified fragmented top plan of a rear portion of the trailer connector of FIG. 1.
Figure 7:
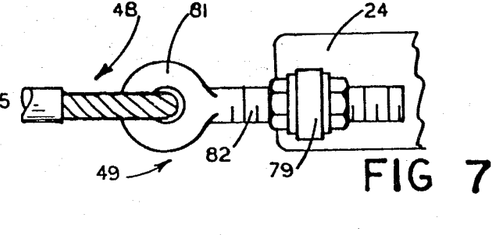
FIG. 7 is a simplified fragmented side elevation of the rear portion of the trailer connector shown in FIG. 6.

FIGS. 6 and 7

The cable anchor 39 for one link portion is as follows. A rear end of the left hand link portion 48 is connected to a portion of the trailer spaced from the longitudinal axis 59, as shown. The link portion 48 has an eye 76 secured by a ferrule 77 in a manner similar to that previously described. A portion of the trailer frame 24 is shown and has a bracket 79 extending from a corner somewhat forward of the wheels 22, a portion of one wheel being shown.

An eye bolt 80 has an eye 81 at a forward end thereof and a threaded shank 82 received in a clearance opening passing through the bracket 79. The clearance opening in the bracket permits the bolt 80 to align itself with the link portion 48, thus reducing or eliminating bending loads on the bolt 80. Nut and washer means 83 and 84 are fitted on opposite sides of the bracket 79 and it can be seen that by loosening one nut and tightening the other nut, the eye bolt 80 can be moved longitudinally according to an arrow 85. This provides a fine adjustment for length of the link portion 48, as well as providing an economical and simple means of securing the link portion to the trailer.

Forward ends of the forward link portions 41 and 42, see FIG. 2, can be similarly secured to the anchors 39 at opposite ends of the front bunk 17 with similar bracket, eye bolt and nut and washer means to provide similar accurate adjustment of length of the forward link portions also. The stabilizing link portion 51 has a rear end similarly connected to the trailer, but the associated bracket extends from the trailer adjacent the longitudinal axis 59. Thus effective length of each of the link portions can be adjusted accurately an adequate amount to permit accurate location of the loop connector 44 relative to the axis 59 of the combination 10. Clearly, prior to use, an accurate alignment of the trailer axles with the tractor axles is required. This alignment is accomplished with the combination parked on smooth level ground and the rear trailer is manually positioned in the approximate location rearwardly of the tractor. Conventional alignment measurements are taken and the nut and bolt means are adjusted to provide fine adjustment of the cable length following, in general, normal alignment practice in maintenance yards.

Figure 8:
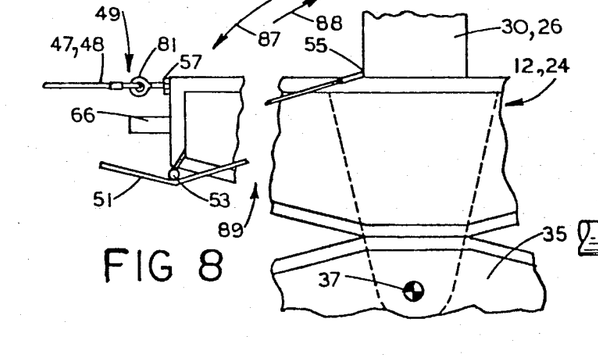
FIG. 8 is a simplified fragmented section on line 8—8 of FIG. 2 showing stabilizing link anchoring means.

FIG. 8

The trailer frame 24 is shown broken and diagrammatically to illustrate the effect of the stabilizing link portion 51 and the pulley 53 relative to the beam axis 37. Without the restraint of the load and the link portions 47, 48 and 51 on the rear trailer, the frame and bunk would be free to rock longitudinally about the beam axis 37 which serves as a transverse rocker axis for the trailer. This is termed a "rocking" trailer. With no load on the trailer 12, tension in the link portions 47 and 48 would apply a turning moment on the frame 24 about the axis 37 in direction of an arrow 87, and tension in the stabilizing link portion 51 through the pulley 53 and cable anchor 55 applies a turning moment in an opposite direction in accordance with an arrow 88. It can be seen that, by fine adjustment of the length of the appropriate link portions, and thus resulting tension, the frame 24 can be stabilized against the rocking tendency that would otherwise occur prior to loading.

In summary, the pulley 53 is positioned within a central plane containing the longitudinal axis 59 (FIG. 2 only) and is spaced beneath the straight line 57 extending between the rear connections of the link portions. The stabilizing link passes downwardly and rearwardly beneath the pulley 53 and then upwardly to the rear connection at the anchor 55 positioned within the central plane and disposed rearwardly of the pulley. Thus, the pulley and position of the rear anchor serve as counteracting means 89 on the trailer cooperating with the stabilizing link portion 51 to counteract a turning moment applied by the rear link portions to the trailer. It can be seen that the actual location of the pulley 53 and the anchor 55 is not critical provided there is sufficient vertical spacing between the rear connections of the rear link portions and the pulley, although the pulley is not required to be positioned directly vertically beneath the straight line 57 connecting the two cable anchors 49. Also, it is not necessary that the anchor 55 is aligned horizontally with the rear link portions as shown. Optimum position of the pulley 53 and anchor 55 would be dependent on geometry of the rear trailer, in particular the location of the beam axis 37 and moment arm of force from the rear link portions relative to the beam axis.

OPERATION

The trailer connector 14 according to the invention permits easy alignment of the trailer axle prior to loading logs onto the bunks, assuming that there has been accurate adjustment of link portion lengths as previously described. After the alignment, the connector 14 serves little purpose apart from that of a redundant safety connection between the trailer and the tractor, and also for providing support for electrical, pneumatic and hydraulic service conduits, not show shown, extending between the tractor and trailer.

At a log loading station, the tractor and trailer are positioned under the log loader, not shown, and all that is required is that the wheels 22 of the trailer run initially on relatively smooth and level ground so as to reduce any tendency of the trailer wheels to move assymmetrically as the tractor moves forwardly. The tractor moves forwardly for a few feet so that the link portions 41, 42, 47, 48 and 51 become taut, at which time the rear bunk 26 will be essentially parallel to the front bunk 17. This is performed slowly so that as the brakes are applied, the wheels of the trailer are braked evenly and slowly so that the bunks remain parallel when both the tractor and trailer stop, thus maintaining approximately equal tautness in all the links. If the trailer has independent braking, it may be advantageous to brake the trailer somewhat before the tractor so as to assist in maintaining tautness of the cables. The brakes are now set on both the tractor and trailer and placement of wheel chocks at the trailer wheels may be advantageous to prevent undesirable shifting. Alternatively, particularly on slippery or slightly sloping ground, in a non-illustrated alternative, a cable can be connected between a rear of the trailer and a winch or other type of towing vehicle, such as a skidder, and the trailer can then be pulled sufficiently away from the tractor to taunten the link portions to permit accurate length adjustment thereof.

The tractor and trailer combination is now ready to accept logs which can be loaded between the front and rear bunks in a normal manner. When loaded, the logs are retained with the tie down cables 63 as required and longitudinal movement of the logs is reduced or eliminated by the serrations which is the normal practice with logging trucks.

It can be seen that this approach to alignment of tractor wheels is considerably quicker and simpler than in the prior art where the "unconnected" trailer is "manually" positioned accurately each time the combination is loaded. With this invention, the trailer is positioned accurately "manually" once only when the link portions are adjusted, after which the alignment is effected automatically by the link portions.

It can be seen that the method according to the invention is characterized by providing a flexible link means and connecting one end of the flexible link means to the swivellable front bunk and an opposite end thereof to the trailer. The tractor is moved forward whilst towing the trailer through the link means until a longitudinal central axis of the trailer, which is undesignated but coincident with the axis 59, is accurately aligned with the pivot axis of the swivellable front bunk. The self-supporting load is placed on the front and rear bunks and the front and rear portions of the load are securely fastened to the front and rear bunks.

ALTERNATIVES AND EQUIVALENTS

Figure 9:
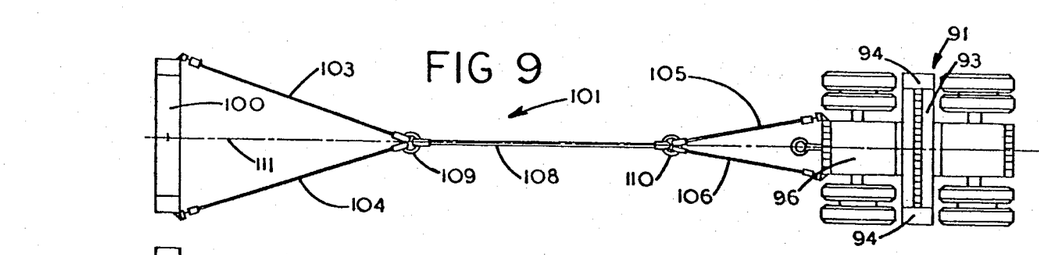
FIG. 9 is a simplified diagrammatic top plan of a second embodiment of a trailer and trailer connector.

FIGS. 9 and 10

A second embodiment of a trailer 91 has a trailer bunk 93 having spaced stakes 94 which are similar to those previously described. The trailer 91 has a trailer frame 96 mounting a conventional tandem axle trailer suspension 98 utilizing sets of resilient springs 99. The frame 96 and suspension is such that there is a negligible rocking tendency between the wheels and the frame and thus is termed a "non-rocking" trailer. With a non-rocking trailer, the stabilizing link 51 of the connector 14 of FIGS. 1 through 8 can be eliminated. This provides a simpler alternative second embodiment of a trailer connector, designated 101, which is limited for use on trailers having a suspension and frame such that there is negligible rocking therebetween, apart from that occuring with normal suspension deflection.

The trailer connector 101 includes right hand and left hand forward link portions 103 and 104 connected to a swivellable front bunk 100 on the tractor, not shown, and right hand and left hand rear link portions 105 and 106 connected to the trailer 91. An intermediate link portion 108 has forward and rear loop connectors 109 and 110 at forward and rear ends thereof. The forward link portions are connected to the forward loop connector, and the rear link portions are connected to the rear loop connector. Ends of the link portions are provided with eyes that cooperate with the loop connectors, and with ring bolts (not shown) mounted in brackets carried on the trailer 91 and the forward bunk in a manner similar to that previously described with reference to FIGS. 5 through 7.

It can be seen that the intermediate link portion 108 extends along a central axis 111 of the combination so as to provide a symmetrical arrangement. A particular advantage for use of an intermediate link portion is that a turnbuckle, not shown, or equivalent length adjustment means can be provided to cooperate with the intermediate link to permit easy length adjustment without adjusting the eye bolts associated with the trailer or front bunk. This prevents a possible loss of alignment that might otherwise occur if the ring bolts were adjusted. Alternatively, intermediate links of different lengths could be fitted between the loop connectors to accomodate loads of widely differing lengths. The intermediate link also serves as a joining means to join the forward link portions to the rear link portions.

Clearly, if desired, the trailer connector 101 could be provided with a stabilizing link portion extending between the rear loop connector 110 and the trailer in a manner similar to the link portion 51 of FIGS. 1 through 3, and this would then permit use of a "rocking" trailer in which the frame thereof could rock relative to the suspension similarly to the trailer 12.

Figure 11:
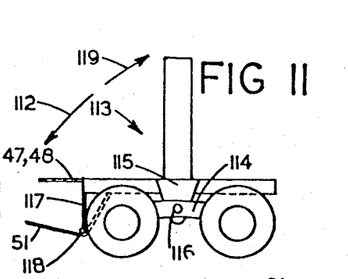
FIG. 11 is a simplified fragmented side elevation of a trailer similar to the trailer of FIG. 1 showing an alternative stabilizing link anchoring means.

FIG. 11

An alternative "rocking" trailer 113 is generally similar to the trailer 12 of FIGS. 1 through 8, but differs by elimination of the pulley 53 and by substituting an upwardly curved walking beam 114 for the beam 35. The beam 114 is journalled on a trailer frame 115 for rocking about a rocker axis or beam axis 116, as previously described. An alternative means to counteract a rocking tendency of the alternative rocking trailer includes a downwards extension 117 extending from a portion of the frame 115 to a cable anchor 118 which is disposed within a central plane containing a central longitudinal axis, neither of which are shown, and below and forwardly of the rocker axis 116. The anchor 118 is connected to a rear end of the stabilizing link portion 51 which is thus positioned forwardly of and below the rocker axis and within the central plane. The rear link portions 47 and 48 (of FIGS. 1 through 8) have rear connections or anchors positioned above the rocker axis and apply a turning moment to the frame about the axis 116 in direction of an arrow 112. The stabilizing link portion 51 applies an opposite turning moment to the frame in direction of an arrow 119. Thus it can be seen that by accurate adjustment of the appropriate link lengths, the trailer can be stabilized against excessive rocking. It can be seen that the downwards extension 117 and the location of the cable anchor 118 cooperating with the stabilizing link portion is thus equivalent to the pulley 53 and cable anchor 55 of FIG. 1, and thus serve as counteracting means on the trailer cooperating with the stabilizing link to counteract a turning moment applied by the rear link portions to the trailer.

Figures 12, 13:
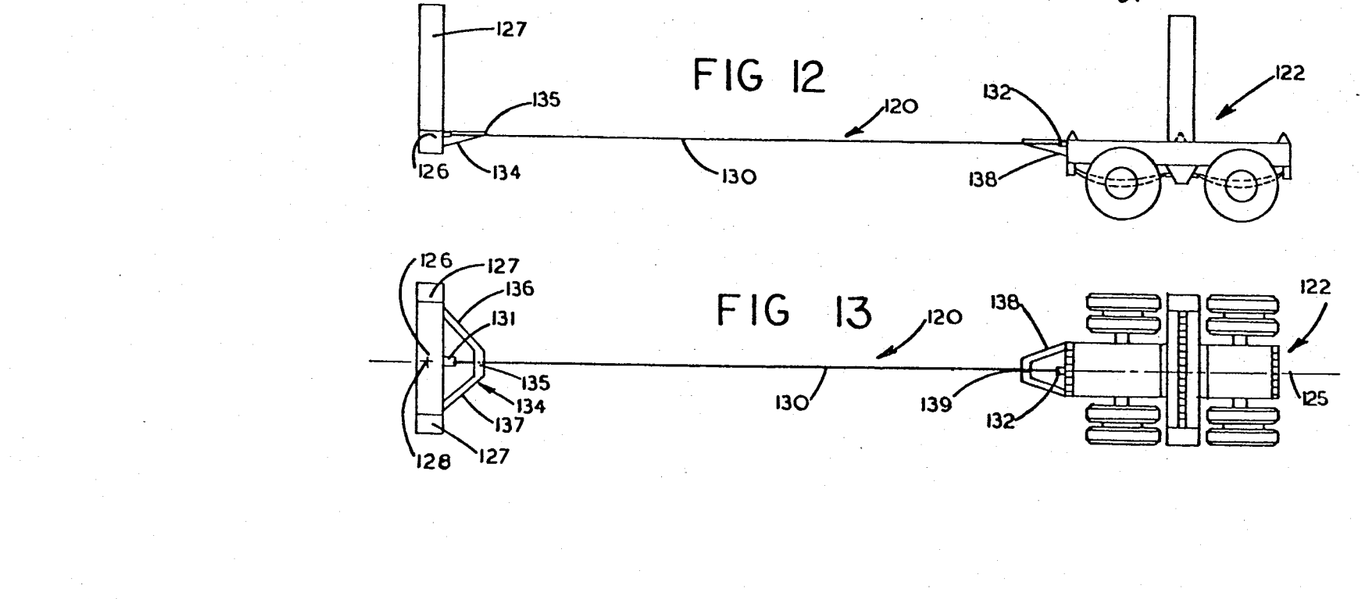
FIG. 12 is a simplified diagrammatic side elevation of a third embodiment of a trailer connector according to the invention.
FIG. 13 is a simplified diagrammatic top plan of a third embodiment of FIG. 12.

FIGS. 12 and 13

A third embodiment of a trailer connector, designated 120, is shown for use with a trailer 122 which is generally similar to the trailer 91 of FIGS. 9 and 10, i.e. a non-rocking trailer. However, as described with reference to FIGS. 9 and 10, if a stabilizing link portion or equivalent were fitted, with suitable modification, the trailer connector 120 could be used with the rocking trailer 12 of FIGS. 1 through 3. A tractor, not shown, has a front bunk 126 having spaced stakes 127 and is mounted for pivotting about an axis 128.

The trailer connector 120 includes a single flexible cable serving as a main flexible tension link portion 130 having a forward end 131 secured centrally of the bunk and a rear end 132 secured centrally of the trailer. The front bunk has a forward alignment frame 134 extending rearwardly therefrom, the frame having a front eye 135 to accept the cable of the portion 130. The frame 134 has right hand and left hand struts 136 and 137 respectively extending from positions spaced equally from the axis 128 to provide a support for the eye 135 that resists sideways and vertical deflections. It can be seen that the alignment frame swings about the pivot axis 128 as the front bunk 126 swivels about the axis. The trailer has a rear alignment frame 138 extending rigidly and forwardly from the trailer, the frame 138 being similar to the frame 134 and having a rear eye 139 therein to accept the link portion 130.

The frames 134 and 138 are forward and rear alignment means provided on the front bunk and trailer respectively. The frames are disposed symmetrically about a central longitudinal axis 125 and function in a manner similar to the right hand and left hand forward and rear link portions of the embodiments shown in FIGS. 1 through 3 and FIGS. 9 and 10.

An alternative structure using the alignment frames as above described could secure forward and rear ends of the portion 130 directly to the alignment frames themselves, thus eliminating the direct connection of the link portion to the front bunk and trailer. The alternative frames would thus carry tensile forces also, and would likely have to be stronger than the frames that merely provide guiding eyes for the cable. Both of these structures could utilize a flexible tension link, preferably a cable, although a link chain could be used in some circumstances. It would be expected that the trailer using the rigid alignment frames as above described would have a slower response for alignment than the cable connectors of FIGS. 1 through 3 and FIGS. 9 and 10.

Figure 14:
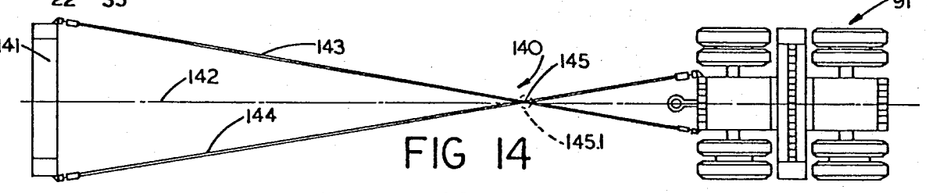
FIG. 14 is a simplified diagrammatic top plan of a fourth embodiment of a trailer connector using the trailer of FIGS. 9 and 10.

FIG. 14

A fourth embodiment of a trailer connector 140 extends between a swivellable front bunk 141 mounted on a tractor, not shown, and the trailer 91 of FIG. 10. Because the trailer 91 is a non-rocking trailer, a stabilizing link portion or equivalent is not required. The fourth embodiment 140 has a central longitudinal axis 142 and first and second diagonal link portions 143 and 144 of generally equal length. The link portions cross each other at an intersection 145 which is generally adjacent the central longitudinal axis 142. For improved tracking, the links can be clamped at the intersection with a cable clamp 145.1, but in some conditions acceptable performance can be obtained with the link portions not connected at this intersection but merely passing each other in a vertical plane. The first link portion 143 extends from a right hand end of the front bunk 141 to a left hand portion of the trailer 91, and the second link portion extends from a left hand front bunk to a right hand portion of the trailer. Connections at opposite ends of the link portions are generally similar to those as previously described, and suitable adjustment means are provided to permit fine adjustment of the length of the link portions. It can be seen that this is one of the simplest embodiments of the trailer connector and, as shown, it can only be used with a non-rocking trailer. When the links are unclamped at the intersection 145, there is usually essentially zero relative axial movement between the link portions 143 and 144, but this arrangement is not preferred for most situations. When the link portions are clamped at 145.1, the clamp means can then be used as an anchor for a forward end of a stabilizing link portion, which could extend to a substitute trailer which could be of the rocking type, and similar to that described with reference to FIG. 1. This alternative is not illustrated, but is clearly an equivalent.

Figure 15:
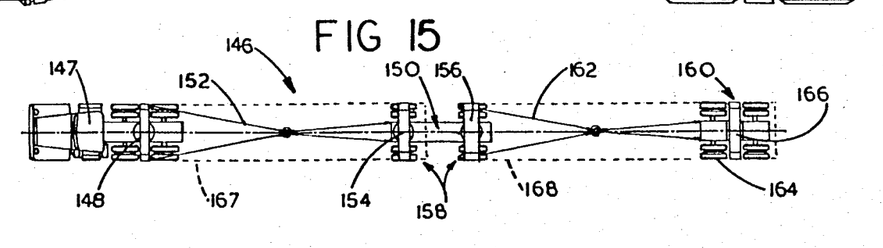
FIG. 15 is a simplified diagrammatic top plan of a tractor and double trailer combination utilizing the first embodiment of the trailer connector of FIGS. 1 through 3.

FIG. 15

An alternative tractor and trailer combination 146 utilizes a conventional tractor 147 with a swivellable front or first bunk 148 mounted for swivelling on the tractor as previously described. An intermediate trailer 150 is connected to the tractor by first trailer connecting means 152 which extend from the front bunk to a forward portion of the trailer 150. The trailer 150 has a fixed intermediate trailer front bunk 154, and a swivellable intermediate trailer rear bunk 156 and is carried on a tandem axle arrangement 158 so as to provide a solid, essentially non-rocking bed for the bunks 154 and 156. A rear trailer 160 is connected to the intermediate trailer 150 by second trailer connecting means 162 extending from the rear bunk 156 to a front of the trailer 160. The trailer 160 is similar to the non-rocking trailer 91 of FIGS. 9 and 10, and has a tandem axle arrangement 164 and a fixed second trailer rear bunk 166. The first and second trailer connecting means 152 and 162 include undesignated front and rear link portions, generally similar to that shown in FIGS. 1 through 3, but the alternatives herein described can be substituted.

The combination 146 can carry two separate self-supporting front and rear loads 167 and 168, shown in broken outline, the loads being mounted between the bunks 148 and 154, and between the bunks 156 and 166 respectively. Clearly, to prevent interference when turning, sufficient clearance must be provided between adjacent ends of the loads overhanging the bunks on the intermediate trailer 150.

In summary, all embodiments of the trailer connector use lengths of flexible steel cable and conventional cable connections, etc., and thus the capital investment for the connector is relatively low. The embodiments of the trailer can be obtained by eliminating the trailer reach and swivellable bunk of a conventional logging trailer and substituting cable anchors and a fixed or non-swivelling bunk. The connector is used as a support for trailer service conduits. The fixed trailer bunk helps to stabilize the load against wobble that can occur with two swivelling bunks.

Summarizing the embodiments structurally, it can be seen that the invention provides a flexible link means with a forward connection means for connecting a forward end portion of the flexible link means to the swivellable front bunk, and a rear connection means for connecting a rear end portion of the flexible link means to the trailer. It can be seen that the forward and rear connection means have several different structures, for example, the forward link portions 41 and 42 and the rear link portions 47 and 48 of FIGS. 1 and 2, the corresponding link portions of FIG. 9, the forward and rear alignment frame 134 and 138 of FIGS. 12 and 13 and the diagonal link portions 143 and 144 of FIG. 14. All these structures are considered to function equivalently and require that the forward connection means have forward portions cooperating with two laterally spaced positions on the swivellable front bunk, and the rear connection means cooperating with two laterally spaced positions on the trailer. The positions on the bunk for the forward connection are spaced equally from the central longitudinal axis, and the positions on the trailer for the rear connection are similarly spaced equally from the longitudinal axis.

I claim:

1. A trailer connector for use in a tractor and trailer combination for carrying an elongated, self-supporting load; in which the tractor has a swivable front bunk mounted for pivoting about a pivot axis and is adapted to retain a front portion of the load thereon; and the trailer has a rear bogey having at least one pair of road bearing wheels and a non-swivelling rear bunk mounted on the bogey and adapted to retain a rear portion of the load thereon; the rear bogey having a suspension such that the rear bunk can rock longitudinally in a forward and rearward manner relatively to the wheels about a transverse rocker axis, the trailer connector comprising:
    (1) flexible link means having
        (a) right hand and left hand forward link portions extending rearwardly from the front bunk,
        (b) right and left hand rear link portions extending forwardly from the trailer,
        (c) joining means to join the forward link portions to the rear link portions,
        the forward and rear link portions forming two isosceles triangles with their vertices adjacent the central longitudinal axis connected and coinciding with each other;
    (2) a stabilizing link extending between a forward connection of the rear link portions and a portion of the trailer spaced beneath a straight line extending between the rear connections of the rear link portions with the trailer; and
    (3) counteracting means on the trailer cooperating with the stabilizing link to counteract a turning moment applied by the rear link portions to the trailer.

2. A trailer connector as claimed in claim 1 further characterized by;
    (a) first and second diagonal link portions of generally equal length intersecting adjacent the central longitudinal axis, the first link portion extending from a right hand portion of the front bunk to a left hand portion of the trailer and the second link portion extending from a left hand portion of the front bunk to a right hand portion of the trailer,
    (b) clamp means for clamping the two diagonal link portions together at their intersection.

3. A trailer and trailer connector as claimed in claim 1 in which the rear connections are positioned above the rocker axis, and in which counteracting means is further characterized by:
    (a) a pulley positioned within a central plane containing the longitudinal axis and spaced beneath the straight line extending between the rear connections of the rear link portions,
    (b) the stabilizing link passing beneath the pulley and upwardly to an anchor positioned within the central plane and disposed rearwardly of the pulley.

4. A trailer and trailer connector as claimed in claim 1 in which the rear connections are positioned above the rocker axis, and in which the counteracting means is further characterized by:
    (a) a downward extension extending from the trailer to a cable anchor positioned below and forwardly of the rocker axis, the anchor being disposed within a central plane containing the central longitudinal axis,
    (b) the stabilizing link portion has a rear end connected to the cable anchor of the downwards extension.

5. A trailer and trailer connector as claimed in claim 1 in which the trailer connector is further characterized by:
    (a) first and second diagonal link portions of generally equal length intersecting adjacent the central longitudinal axis, the first link portion extending from a right hand portion of the front bunk to a left hand portion of the trailer and the second link portion extending from a left hand portion of the front bunk to a right hand portion of the trailer,
    (b) clamp means for clamping the two diagonal link portions together at their intersection.

6. A trailer connector for use in a tractor and trailer combination having a rear trailer and an intermediate trailer disposed between the tractor and the rear trailer for carrying two separate self-supporting front and rear loads, in which the tractor has a swivable front bunk mounted for pivoting about a pivot axis and is adapted to retain a front portion of the load thereon; the rear trailer has a rear bogey having at least one pair of road bearing wheels, and a non-swivelling rear bunk mounted on the bogey and adapted to retain a rear portion of the load thereon; and the intermediate trailer has a fixed intermediate trailer front bunk and a swivable intermediate trailer rear bunk, the front load being carried on the front bunk of the tractor and the intermediate trailer front bunk, and the rear load being carried on the intermediate trailer rear bunk and the bunk of the rear trailer; the trailer connector comprising:
    (1) first right hand and left hand forward link portions extending rearwardly from the front bunk of the tractor,
    (2) first right and left hand rear link portions extending forwardly from the intermediate trailer,
    (3) first joining means to join the first forward link portions to the first rear link portions,
    (4) second right hand and left hand forward link portions extending rearwardly from the rear bunk of the intermediate trailer,
    (5) second right hand and left hand rear link portions extending forwardly from the rear trailer; and
    (6) second joining means to join the second forward link portions to the second rear link portions,
    the trailer connector automatically aligning both the trailers behind the tractor.

* * * * *